(12) United States Patent
Zahradnik

(10) Patent No.: US 6,495,804 B2
(45) Date of Patent: Dec. 17, 2002

(54) METHOD OF AND SYSTEM FOR HEATING AND COOLING AN EXTRUDER CYLINDER

(75) Inventor: Rudolf Zahradnik, Mistelbach (AT)

(73) Assignee: Theysohn Extrusionstechnik Gesellschaft m.b.H., Korneuburg (AT)

( * ) Notice: Subject to any disclaimer, the term of this patent is extended or adjusted under 35 U.S.C. 154(b) by 0 days.

(21) Appl. No.: 09/801,324

(22) Filed: Mar. 7, 2001

(65) Prior Publication Data

US 2001/0025708 A1 Oct. 4, 2001

(30) Foreign Application Priority Data

Mar. 7, 2000 (AT) ................................ 377/00

(51) Int. Cl.[7] .................. B29B 13/02; B29C 47/82; B29C 47/78; H05B 3/42
(52) U.S. Cl. .................. 219/421; 219/422; 219/424; 425/144; 264/40.6
(58) Field of Search .................. 219/421, 422, 219/424, 426; 222/146.5; 425/144, 143, 378.1, 549; 264/40.6

(56) References Cited

U.S. PATENT DOCUMENTS

| | | | | |
|---|---|---|---|---|
| 3,698,844 A | * | 10/1972 | Grimm | 425/144 |
| 4,088,430 A | * | 5/1978 | Giles | 425/144 |
| 4,102,958 A | * | 7/1978 | Wertz | 264/40.6 |
| 4,183,448 A | * | 1/1980 | Nash | 222/146.5 |
| 4,272,466 A | * | 6/1981 | Harris | 264/40.6 |
| 4,548,341 A | * | 10/1985 | Hambleton | 219/422 |
| 4,784,595 A | * | 11/1988 | Halter | 425/144 |
| 5,149,193 A | * | 9/1992 | Faillace | 264/40.6 |
| 5,355,938 A | * | 10/1994 | Hosoya et al. | 264/40.6 |
| 5,567,369 A | * | 10/1996 | Beckwith | 264/40.6 |

FOREIGN PATENT DOCUMENTS

| | | |
|---|---|---|
| DE | 1 939 248 | 2/1971 |
| DE | 33 08 138 A1 | 9/1984 |

OTHER PUBLICATIONS

Doppelschneckenextruder—Maschinenbauliche Grundlagen—(Literatur S.526)—pp. 513–527.
Twin Screw Extruders—Theysohn Extrusionstechnik System Maplan.

* cited by examiner

*Primary Examiner*—Joseph Pelham
(74) *Attorney, Agent, or Firm*—Herbert Dubno

(57) ABSTRACT

An extruder cylinder is heated by resistance heaters surrounding cooling coils around respective segments of the extruder cylinder which is subdivided into heating and heating or cooling zones therealong. The rate of flow of the heat-carrier oil in the coil or the rate of flow of a cooling medium in heat exchange therewith can be regulated to control the cooling effect of the heat-carrier oil which can continue to flow through the coil even during purely heating phases for temperature equalization over the zone.

10 Claims, 3 Drawing Sheets

METHOD OF AND SYSTEM FOR HEATING AND COOLING AN EXTRUDER CYLINDER

SPECIFICATION

1. Field of the Invention

My present invention relates to a method of heating and cooling an extruder cylinder and to a system for such cooling or heating utilizing a tubular coil in heat exchanging relationship with the cylinder of the extruder, especially a double-worm extruder or a double-screw extruder, and a resistance heater outside the coil.

2. Background of the Invention

Extruder cylinders for plastifying and extruding synthetic resins and plastifyable master batches can comprise an extruder cylinder having two bores in which respective screws or worms are rotatable and in which the two screws or worms mesh with one another. The bores themselves may intersect and have a figure eight or eyeglass shape as seen in cross section.

The cylinder is usually divided into a plurality of heating zones or heating/cooling zones which are axially offset along the cylinder, i.e. one zone may follow the other along the cylinder and the pair of the plastic materials which is to be extruded. The cooling is effected by a heat-carrier oil which can be pumped through a cooling coil in heat-exchanging relationship with the cylinder. During the cooling operation, the heat-carrier oil can transfer heat to a cooling media. The heating of the extruder cylinder is normally effected by one or more resistance heaters, i.e. electric heaters, which are arranged outside of the turns of the cooling coil. During purely heating phases, the heat-carrier oil may continue to be passed through the coil as a tempering agent which is intended to ensure a uniform distribution of temperature in the cylinder. For this purpose a minimum or reduced oil flow can be provided.

The apparatus can include a pump for displacing the heat-carrier oil through at least one such cooling coil or through all of the cooling coils and the electric resistance heating element can extend over the length of at least one coil or the array of coils.

Double-screw extruder cylinders must be heated at least intermittently and must be cooled at least over a portion of the length of the extruder cylinder. It is therefore advantageous to subdivide the cylinder into a plurality of segments along its length which may be referred to as heating zones or heating/cooling zones so that temperature regulation of the various zones can be optimized to the process requirements. Generally, before production begins, the entire cylinder must be heated. In all of the heating zones or the heating/cooling zones, therefore, the temperature control operation is exclusively a heating operation. Depending upon the size of the extruder this stage can take several hours. During operation, i.e. extrusion following the initial heating stage, certain of the upstream zones may have to be heated while at the discharge end one or more zones scarcely requires heating and often must be cooled. Regardless of whether heating or cooling is being carried out, tempering, i.e. temperature distribution so that there are no heating and cooling peaks, must be ensured and such tempering is independent of whether or not the phase is a heating phase or a cooling phase. The extent to which tempering is required may depend upon the geometric shape of the cylinder cross section (Handbuch der Kunststoff-Extrusionstechnik, Bd. I Grundlagen, page 522, Zylindertemperierung, Karl Hanser Verlag 1989).

The cylinder normally has a circular cross section and the eyeglass shape bores have the configuration of a figure eight. The perpendicular distances from surfaces of the bore to the external surface of the cylinder thus vary around the cross section and hence the distance through which heat must be conducted from an outer heating or cooling unit to the interior can vary significantly.

The electric resistance heater body can completely surround the cylinder but in the past the cooling has been effected either with air, utilizing blowers to carry out the heat exchange between the surface of the cylinder and the ambient air, or with heat carrier oil which can traverse a cooling element embedded in the cylinder. There are also embodiments in the prior art in which the resistance heating is incorporated into highly heat-conductive bodies or are mounted on such bodies. Cooling tubes or air-cooling ribs can also be integrated in these bodies. The air cooling is simple and clean but has limits with respect to the cooling efficiency.

Especially in machines with high production rates with high cooling demands and/or which may be operated in environments with high ambient temperatures, air cooling has only limited value and is not used. While additional cooling ribs in the cylinder or buffers can improve air cooling results, the limits on air cooling have required the use of additional heat exchanges or cooling units. Such additional air cooling units are expensive and are often not cost effective.

In such cases, the heat-carrier oil is used to cool at least a portion of the extrusion cylinder of a high output machine.

In these cases, the zones which must be cooled can be cooled with the heat-carrier oil and the oil can, in turn, be cooled in a heat exchanger with water. The cooling tube for each heating zone can be provided in a helical groove in the outer wall of the cylinder and rolled into place so that the outer surface is smooth, i.e. the tube is flush with the outer surface. Around this cooling tube a conventional electric resistance heating strip or jacket is mounted. When cooling is required, the cooling tube is traversed by cooled heat-carrier oil. If heating is required, the extruder is electrically heated by heat conduction through the cooling tube.

In such systems the temperature control is a three-point control providing three distinct temperature states, namely, tempering (temperature distribution for uniformity), heating on, cooling off; heating and cooling off; cooling on heating off.

To ensure sufficient heating transfer during the heating phases, it is advantageous to leave the cooling turns filled with the heat-carrier oil. Since the electric resistance heating body reaches a higher surface temperature in the heating phases than the heating carrier oil and the heat-carrier oil is raised for long periods of time to such high temperature, it is practically unavoidable that the oil intended for the tempering operation will thermally degrade. The result is cracking products like carbon black and carbonaceous agglomerates which can deposit in the piping and valves. In time these deposits can plug up the piping. If one empties the cooling coil during the heating states, the thermal decomposition is not reduced but rather is increased where there remains traces of the oil. Because the heat conductivity through the tube is increased, the heating band temperatures rise still higher and any film of oil adhering to the interior of the tube is more rapidly cracked.

One solution to this problem is to maintain a minimal oil flow during the heating phases via a bypass path (see the brochure of Theysohn Extrusionstechnik, 1993, page 7).

This minimum oil flow does not significantly detract from the heating although it does increase the amount of oil which is utilized in the system. It is an disadvantage of this system that it is subject to breakdown. The reduced oil flow is brought about by a reduced cross section in the bypass. The small cross section here can also be easily stopped up even by a reduced quantity of carbonaceous material formed by degradation of the oil. The provision of very fine filters upstream of the parts which may be plugged up only delay the problem.

OBJECTS OF THE INVENTION

It is the principal object of the present invention to provide the method of controlling the temperature of an extruder and especially a double-screw extruder whereby these drawbacks are avoided.

Another object of the invention is to provide an improved method of operating an extruder of the type described which permits of selective heating and cooling of respective extruder zones without the danger of plugging of the piping and with a more effective distribution of the temperature than has hitherto been the case.

It is also an object of this invention to provide more precise temperature control in an extruder system.

SUMMARY OF THE INVENTION

These objects and others which will become apparent hereinafter are attained, in accordance with the invention in that the oil flow rate is controlled as a function of the temperature by a continuously-operating temperature controller and continuously from a minimum flow to a maximum flow. Alternatively, the flow rate (volume rate of flow) of the cooling medium for the heat-carrier oil is controlled by a continuously operating temperature regulator flow, the flow rate of the heat-carrier oil is maintained constant.

In the first method of heating and cooling the extruder cylinder, the steps involved are:

effecting heat exchange between the cylinder and at least one tubular coil extending along the cylinder in at least one of the zones;

heating the at least one of the zones with a resistance heating element outside the coil;

passing a heat-carrier oil through the coil during extrusion and cooling the heat-carrier oil by heat exchange with a cooling medium;

maintaining a reduced flow rate of the heat-carrier oil through the coil even during a purely heating phase of the cylinder to equalize a distribution of temperature in the cylinder; and controlling the flow rate of the heat-carrier oil through the coil continuously between a minimum flow rate and a maximum flow rate in response to temperature of the cylinder with a continuously operating temperature regulator.

In the second method the steps are:

effecting heat exchange between the cylinder and at least one tubular coil extending along the cylinder in at least one of the zones;

heating the at least one of the zones with a resistance heating element outside the coil;

passing a heat-carrier oil through the coil during extrusion and cooling the heat-carrier oil by heat exchange with a cooling medium;

maintaining a reduced flow rate of the heat-carrier oil through the coil even during a purely heating phase of the cylinder to equalize a distribution of temperature in the cylinder; and controlling a flow rate of the cooling medium into heat exchange with the heat-carrier oil continuously in response to temperature of the cylinder with a continuously operating temperature regulator.

The first method obviates the drawbacks described previously by utilizing a pump which is controlled in accordance with the cooling requirements to vary its output or utilizes a variable valve which passes the requisite flow rate of the heat-carrying oil as a function of the continuously-operated temperature controller. The minimum coil flow does not pass through a bypass passage of a reduced cross section during the heating phases but rather, by a reduction of the displacement of the pump or the displacement permitted by the valve, is brought to a minimum volume rate of flow. The danger of blockage of the bypass is therefore eliminated because of the continuous control. Moreover, the precision of the heating and cooling is enhanced by comparison with the known three-point control.

The second method of the invention differs from the first in that the flow rate of the cooling medium is varied and hence the effect of heat exchange of the heat-carrier oil is altered to maintain the temperature in the moisture constant. In this case the oil flow rate can be maintained substantially constant (although naturally slight variations in flow can be permitted) so that the problems hitherto encountered with a minimum oil flow no longer arise.

In the first method in which the oil flow rate is varied by the temperature controller on a continuous basis, it is advantageous to maintain the temperature of the circulating heat-carrier oil approximately constant by control of the coolant flow. A constant temperature of the heat-carrier oil simplifies temperature control in the extruder.

It has been found to be advantageous, moreover, in the second method of the invention when the cooling medium supplied to the heat-carrier oil is controlled as a function of the temperature of the heat-carrier oil. Depending upon the operating conditions, different oil temperatures can be required and, once established, can be controlled by varying the coolant flow rate. The coolant or cooling medium is, of course, in heat-exchanging relationship with the heat-carrier oil.

The heat-carrier oil which is pumped through the cooling turns of the coil during the heating phase can be effectively used for heat transfer and temperature distribution when its temperature is raised above the cooling temperature, e.g. by appropriate reduction in the heat transfer between the cooling medium and the oil and by heating from the electrical resistance heater. A simple way of varying the oil flow is to vary the speed of the drive for the pump. Alternatively, the oil flow can be varied by means of a proportional valve.

The system of the present invention can thus include a variable speed drive for the pump or the aforementioned proportional valve for at least one cooling zone. With this drive or proportional valve the oil flow can be regulated in accordance with the method variants described.

Advantageously, the cross section of the extruder cylinder in at least one of the heating zones is somewhat elliptical or of somewhat oval shape. In this manner the spacing of the cooling turns and the heating element from the material to be cooled is at least approximately the same around the screws and the material and the temperature control is thereby improved.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
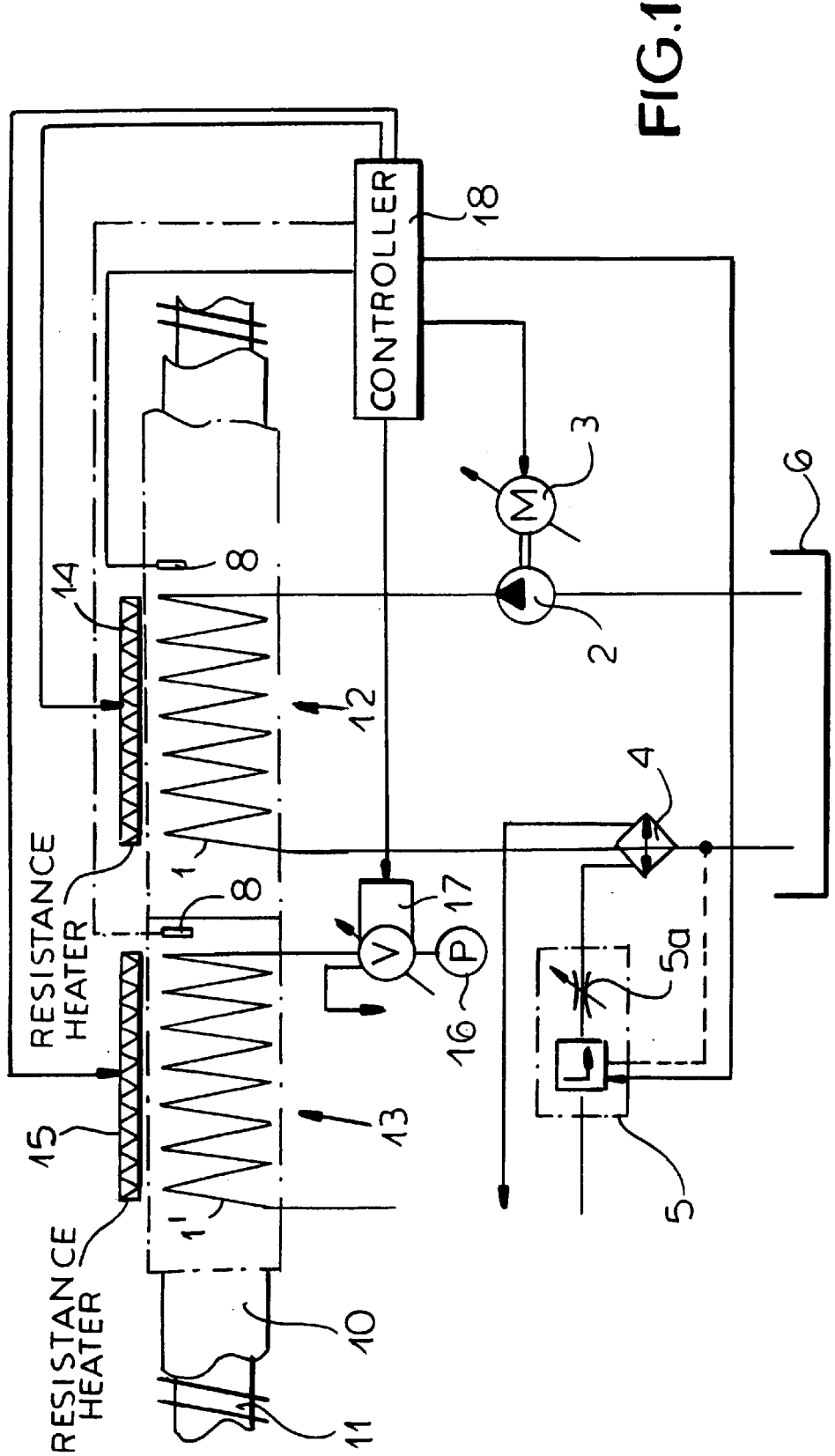
FIG. 1 is a diagram illustrating the principle of the invention.

FIG. 1 shows an extruder cylinder 10 which can have a pair of screws or worms 11 and can be subdivided into zones 12 and 13, etc., represented only symbolically. Each zone, which can provide heating and cooling, can be equipped with a tubular coil 1 and with a resistance heater 14, 15 and each coil can receive the heat-carrier oil from a pump 2 or 16. The pump 2 is a variable displacement pump driven by a variable speed motor 3 while the pump 16 can be a constant displacement pump driven by a motor not shown and feeding the coil 1' through a proportional valve 17 for example. The controller 18 operates the motor 3, the proportional valve 17 and resistance heaters 14 and 15 as required and may have inputs including inputs from the temperature sensors 8 to be described in greater detail hereinafter.

Temperature control is effected in the embodiment of FIG. 1 via the valve 5 which delivers the cooling medium such as cooling water through a variable throttle passage 5a to the heat exchanger 4 which controls the temperature of the heat-carrier oil. Thus the extruder in FIG. 1 has cooling coils 1, 1' which receive the heat-carrier oil from a tank 6 via the pumps 2, 16 so that the heat-carrier oil is pumped through the coils 1, 1'. From the coils 1, 1' the heat-carrier oil passes through respective heat exchangers 4 which are cooled by the water. The pump 2 has its motor 3 controlled so that the motor 3 runs at maximum rotary speed for maximum cooling requirements. In the absence of the need to cool the oil or during the heating phases, the motor 3 operates with a minimum speed so that a minimum throughput traverses the coil 1. Similarly, the proportional valve 17 permits maximum flow through the coil 1' for maximum cooling and for minimum cooling or during the heating phases, enables the oil to flow at a low rate through the coil 1'.

In each case the amount of cooling water required to cool the water is determined by the controllable valve 5 which so operates that the cooling independently of the oil throughput is controlled by the valve 5 to maintain the temperature of the heat-carrier oil constant.

During the heating phases, the heat-carrier oil is brought to a higher temperature than that which is required for use for cooling. Apart from the advantage that the heat-carrier oil is constantly in flow through the coil 1 and thermal overloading is thereby precluded, the system has the further advantage that the oil flow serves for uniform temperature distribution in the cylinder. The flow direction in the cylinder can, depending upon the requirements, be in the same direction or counter the movement of the material to be extruded. The cooling circulation can have multiple paths with each circulating path having one or more pumps and serving one or more zones and the heat exchangers can operate in uniflow, counterflow or cross flow. The heat exchanger 4 can be provided in the outflow side of the coil or the inflow side thereof.

Figure 2:
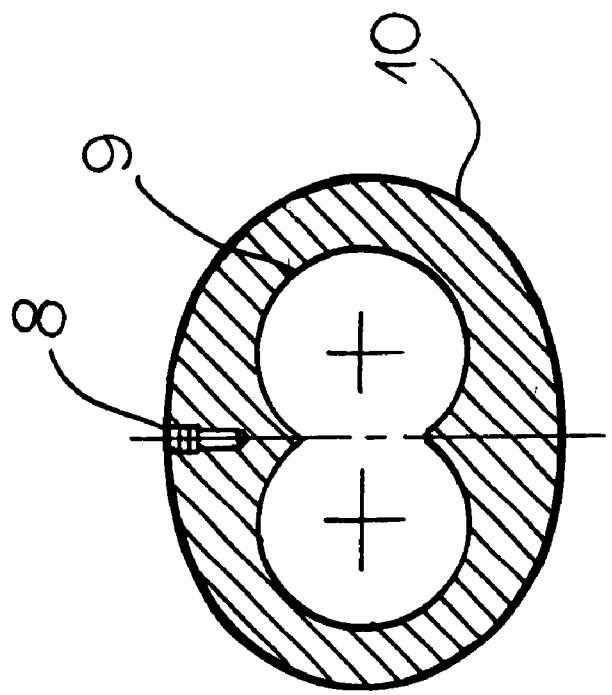
FIG. 2 is a cross section through an extrusion cylinder of circular cross section.
Figure 3:
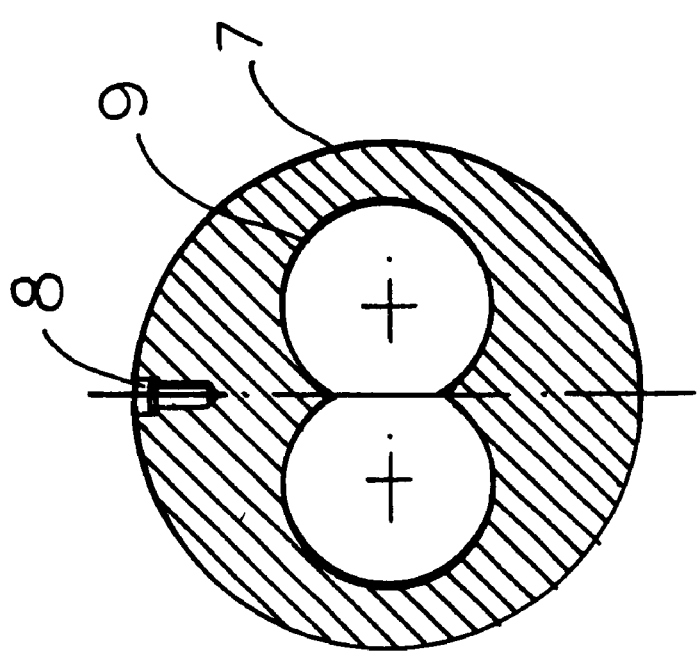
FIG. 3 is a cross section through a cylinder of an elliptical or oval cross section.

As can be seen from FIGS. 2 and 3, the outer surface 7 of the cylinder can be circular (FIG. 2) or elliptical as shown for the outer surface 10 of the cylinder of FIG. 3. The bores accommodating the screws have a figure eight configuration as shown at 9 and resemble a pair of spectacles. Within these bores the two screws of the extruder mesh and advance the material to be extruded axially therealong through the successive heating and cooling segments. The measurement of the temperature is effected by a thermoelement such as a thermocouple 8 in a bore formed in the cylinder wall (see FIGS. 2 and 3). The elliptical cross section, as a comparison of FIGS. 2 and 3 will show, provides a shorter path for the heat which must flow from the external surface 7 or 10 to the material within the bore 9 or vice versa. The elliptical shape, therefore, makes the heating up time and the cooling time faster because of the shorter distances required for heat flow.

Figure 4:
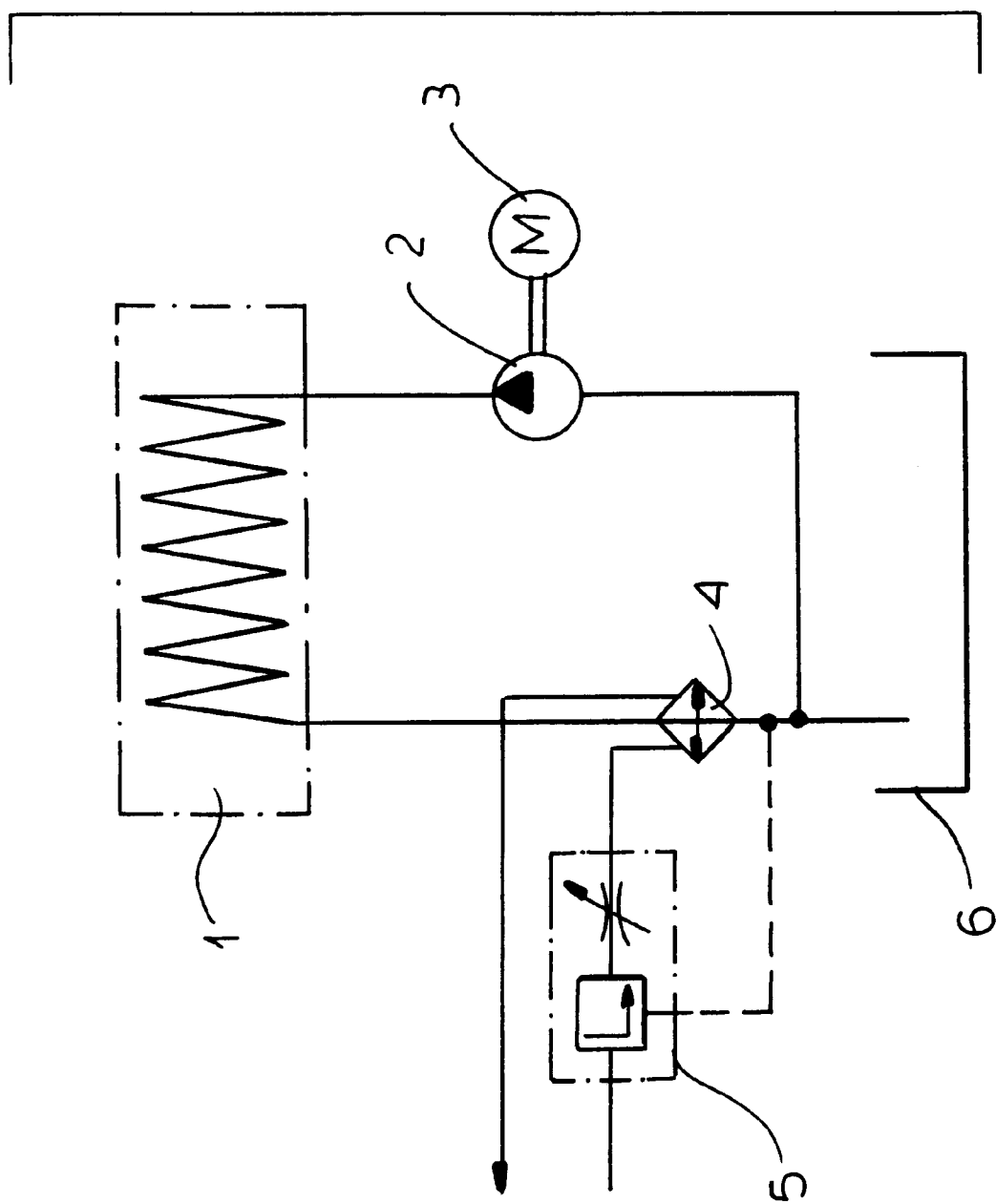
FIG. 4 is a diagram of another approach to the method of the invention.

The variant shown in FIG. 4 does not control the cooling by the quantity or volume rate of flow of the heat-carrier oil itself but rather by the rate of flow of the cooling medium for the heat-carrier oil. In this case, even during the heating phases the full flow of the heat-carrier oil is maintained by the constant displacement pump 7. The oil is circulated and the tank 6 receives only a quantity of oil required for compensation for thermal expansion and contraction and volume changes in the system and, of course, to receive the oil upon emptying of the system. Since the circulating quantity is relatively small, there are minimal heat losses. The temperature distribution in the extruder cylinder is optimal for heating as well as for cooling.

I claim:

1. A method of heating and cooling an extruder cylinder subdivided along a length thereof into a plurality of heating or heating and cooling zones which comprises the steps of:

effecting heat exchange between said cylinder and at least one tubular coil extending along the cylinder in at least one of said zones;

heating said at least one of said zones with a resistance heating element outside said coil;

passing a heat-carrier oil through said coil during extrusion and cooling said heat-carrier oil by heat exchange with a cooling medium by separate passage of the oil and cooling medium through a heat exchanger;

maintaining a reduced flow rate of said heat-carrier oil through said coil even during a purely heating phase of said cylinder to equalize a distribution of temperature in said cylinder; and controlling a flow rate of the cooling medium into heat exchange with said heat-carrier oil continuously in response to temperature of said cylinder with a continuously operating temperature regulator, said heat-carrier oil being brought to a higher temperature than the temperature of said heat-carrier oil during cooling thereby for said reduced flow rate during said purely heating phase, the cooling medium flow rate being controlled by the temperature of the heat-carrier oil.

2. A method of heating and cooling an extruder cylinder subdivided along a length thereof into a plurality of heating or heating and cooling zones which comprises the steps of:

effecting heat exchange between said cylinder and at least one tubular coil extending along the cylinder in at least one of said zones;

heating said at least one of said zones with a resistance heating element outside said coil;

passing a heat-carrier oil through said coil during extrusion and cooling said heat-carrier oil by heat exchange with a cooling medium by separate passage of the oil and cooling medium through a heat exchanger;

maintaining a reduced flow rate of said heat-carrier oil through said coil during all heating phases of said cylinder to equalize a distribution of temperature in said cylinder; and controlling a flow rate of the cooling medium into heat exchange with said heat-carrier oil continuously in response to temperature of said cylinder with a continuously operating temperature regulator, said heat-carrier oil being brought to a higher temperature than the temperature of said heat-carrier oil during cooling thereby for said reduced flow rate during said purely heating phase.

3. An apparatus for controlling heating and cooling of an extruder cylinder subdivided along a length thereof into a plurality of heating or heating and cooling zones, comprising:

a resistance heater in heat exchange relationship with said cylinder for heating at least one of said zones;

a tubular coil in heat exchange relationship with said cylinder along at least said one of said zones;

a pump connected to said coil for displacing a heat-carrier oil through said coil for cooling of said one of said zones, said resistance heater extending over said coil;

a heat exchanger connected to said coil and traversed eparately by said heat-carrier oil and by a cooling medium for cooling said heat-carrier oil; and means responsive to temperature for controlling a rate of flow of said cooling medium for controlling the rate of cooling of said one of said zones by said heat-carrier oil, and including means whereby said heat-carrier oil is brought to a higher temperature than the temperature of said heat-carrier oil during cooling thereby for said reduced flow rate during said purely heating phase and for passing a predetermined minimum quantity of the heat-carrier oil through said coil during all heating phases of said one of said zones.

4. The apparatus defined in claim 3 wherein said pump is a variable displacement pump for varying the rate of flow of said heat-carrier oil through said coil.

5. The apparatus defined in claim 3, further comprising a proportional valve in series with said pump and said coil for controlling a rate of flow of said heat-carrier oil through said coil.

6. The apparatus defined in claim 3 wherein said cylinder has a substantially elliptical or oval cross section in said one of said zones.

7. The apparatus defined in claim 3 wherein said cylinder is a double screw extruder cylinder.

8. A method of heating and cooling an extruder cylinder subdivided along a length thereof into a plurality of heating zones or heating and cooling zones which comprises the steps of:

(a) effecting heat exchange between said cylinder and at least one tubular coil extending along the cylinder in at least one of said zones;

(b) heating said at least one of said zones with a resistance heating element outside said coil;

(c) passing a heat-carrier oil through said coil during extrusion and cooling said heat-carrier oil by heat exchange with a cooling medium;

(d) maintaining a reduced flow rate of said heat-carrier oil through said coil during all heating phases of said cylinder to equalize a distribution of temperature in said cylinder; and (e) controlling the flow rate of the heat-carrier oil through said coil continuously during all heating and cooling phases between a minimum flow rate and a maximum flow rate in response to temperature of said cylinder with a continuously operating temperature regulator.

9. A method of heating and cooling an extruder cylinder subdivided along a length thereof into a plurality of heating zones or heating and cooling zones which comprises the steps of:

(a) effecting heat exchange between said cylinder and at least one tubular coil extending along the cylinder in at least one said zones;

(b) heating said at least one of said zones with a resistance heating element outside said coil;

(c) passing a heat-carrier oil through said coil during extrusion and cooling said heat-carrier oil by heat exchange with a cooling medium;

(d) maintaining a reduced flow rate of said heat-carrier oil through said coil even during all heating phases of said cylinder to equalize a distribution of temperature in said cylinder; and (e) controlling a flow rate of the cooling medium into heat exchange with said heat-carrier oil continuously during all heating and cooling phases in response to temperature of said cylinder with a continuously operating temperature regulator.

10. An apparatus for controlling heating and cooling of an extruder cylinder subdivided along a length thereof into a plurality of heating or heating and cooling zones, comprising:

a resistance heater in heat exchange relationship with said cylinder for heating at least one of said zones;

a tubular coil in heat exchange relationship with said cylinder along at least said one of said zones;

a pump connected to said coil for displacing a heat-carrier oil through said coil for cooling of said one of said zones, said resistance heater extending over said coil;

a heat exchanger connected to said coil and traversed by cooling medium for cooling said heat-carrier oil; and means responsive to temperature for controlling a rate of flow of at least one of said oil and said cooling medium for controlling the rate of cooling of said one of said zones by said heat-carrier oil continuously during all heating and cooling phases and for passing a predetermined minimum quantity of the heat-carrier oil through said coil during all heating phases of said one of said zones.

* * * * *